Feb. 24, 1942.   M. KATCHER   2,274,419
THRUST BALL BEARING
Filed Dec. 21, 1940
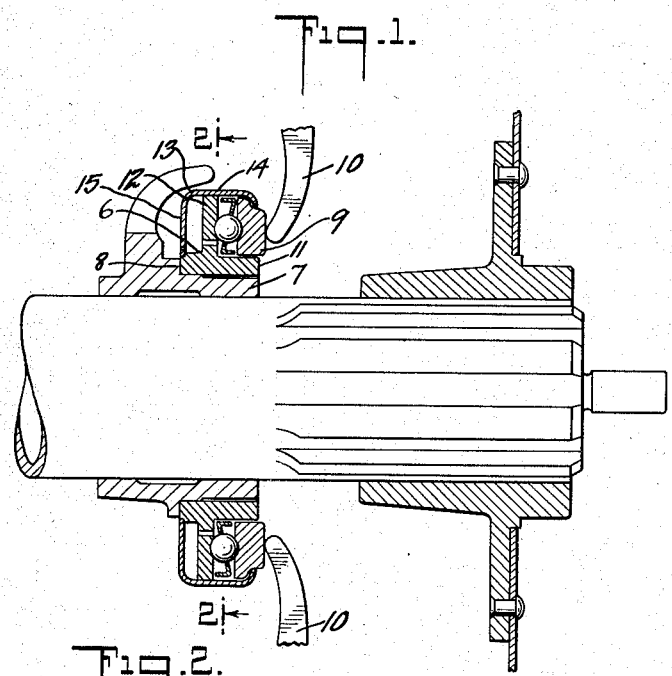
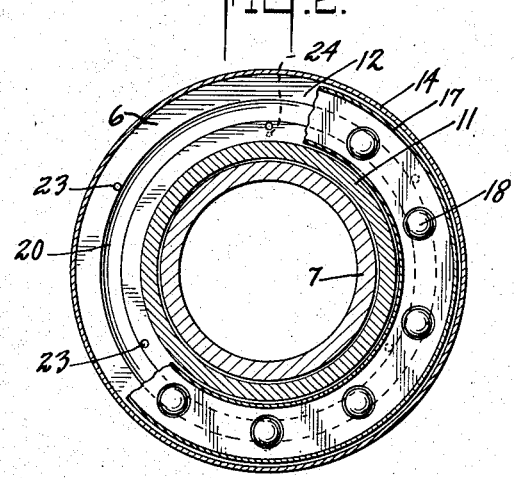
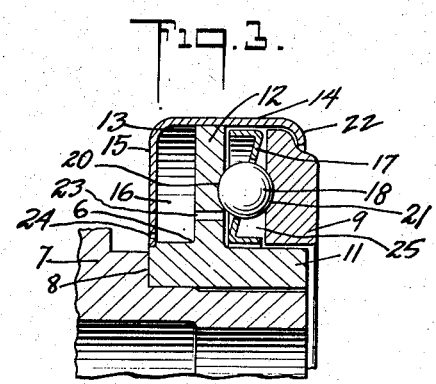
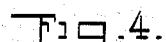
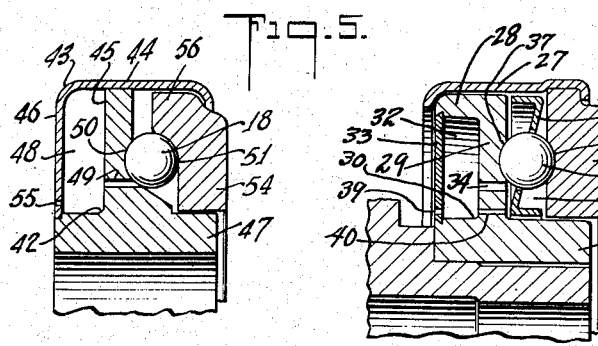
INVENTOR
MORRIS KATCHER
BY
Emanuel Scheyer
ATTORNEY Patented Feb. 24, 1942

2,274,419

UNITED STATES PATENT OFFICE 2,274,419

THRUST BALL BEARING

Morris Katcher, New York, N. Y.

Application December 21, 1940, Serial No. 371,080

6 Claims. (Cl. 308—187)

This invention relates to ball bearings, and more particularly to those thrust ball bearings which are used as the clutch release bearing of an automobile. It is desirable in a ball thrust bearing to have efficient lubrication with a minimum escape of the lubricant, both to avoid the necessity of supplying additional lubricant to the bearing and to prevent the likelihood of the lubricant getting on the friction surfaces of the normally dry clutch. With my design the escape of lubricant is kept to a desired minimum, and by the provision of a reservoir in addition to the space between the raceways, enough lubricant can be put in the bearing to last for the life of the bearing. As is readily understood, however, provision can be made for a grease fitting leading to the reservoir to replenish the lubricant if necessary. The reservoir substantially protects the lubricant held within it from the atmosphere to prevent deterioration. Only enough lubricant is discharged at any time from the reservoir into the space between the race rings for efficient lubrication, the discharge being through passages of small cross section. Capillary passages may be used. The reservoir is situated in a space provided in the fixed race ring away from the balls or rolling members, said space being only partially closed by said ring, a thin walled shell or annular member being provided to close off said space where not enclosed by the ring.

This application shows modifications of bearings forming the subject matter of my Patents Nos. 2,217,801 dated October 15, 1940, 2,219,321 dated October 29, 1940, and 2,235,431 dated March 18, 1941, the shell does not have an axially extending cylindrical wall inside either the fixed race ring or the free race ring, the fixed race ring in the particular embodiment shown being fixed to a slidable hub. The fixed race ring is essentially T-shaped in cross section with the stem of the T extending radially outward from the head at an intermediate point on the latter. On one side of the stem the balls roll, on the other is the reservoir. A feed passage or passages lead from the reservoir through said stem and discharge lubricant preferably into one of the ball grooves. In addition to the feed passages, the reservoir is connected to atmosphere by one or more small vents which permit entrance of air into the reservoir as the grease leaves it. The venting may be through the fixed race ring as in my prior patents or said application and/or it may be through the aforementioned shell. In one form, the shell closing off the reservoir is extended axially to pass over the outer periphery of the stem and to engage slidably the free race ring to prevent the axial separation of the latter from the fixed race ring. In another form, an additional shell is provided to the one closing off the reservoir, said additional shell being fixed to the free race ring and extending axially over the fixed race ring but slidable with the periphery thereof. As the bearing heats with use, a stiff lubricant being used, said lubricant travels through the feed passage or passages to the balls or rolling members. Still another form is one capable of taking radial thrust.

Other objects and advantages will become apparent upon further study of the description and drawing, in which:

Fig. 1 is a vertical longitudinal or axial section of a typical automobile clutch release bearing modified to embody my invention.

Fig. 2 is a cross section taken along the line 2—2 of Fig. 1.

Fig. 3 is a partial longitudinal section through the bearing of Figs. 1 and 2, to an enlarged scale, showing a type of bearing in which the shell is fixed to the fixed race ring.

Fig. 4 is a partial longitudinal section through a bearing to an enlarged scale showing a type of bearing in which the shell is fixed to the free race ring, and Fig. 5 is a partial longitudinal section through a bearing to an enlarged scale showing a type of bearing capable of taking radial as well as axial thrust.

Fixed race ring 6, Figs. 1–3, is given a drive or tight fit on floating or sliding hub 7. Fixed race ring 6 is T-shaped in cross section with the head 11 of the T forming a ring tightly fitting hub 7. The rear of said head abuts a shoulder 8 on said hub.

The sliding hub, it will be understood, is reciprocated by the conventional clutch pedal. The forward face of free race ring 9 is contacted by a plurality of radially arranged clutch release levers or fingers 10. Stem or rib 12 of fixed race ring 6 extends substantially radially outward from an intermediate portion of head 11. Fixed race ring 6 has a tight fit in spun sheet metal shell 13, the outer periphery of rib 12 being in a tight fit with the inside of the axially extending wall 14 of shell 13, while the rear or radially extending wall 15 has its inner edge in tight contact with head 11. Shell 13 cooperates with fixed race ring 6 to the rear of rib 12 and radially outward from head 11 to form a lubricant reservoir 16. Z-shaped retainer ring 17, with balls 18 in spaced openings in its web is loosely set inside shell 13 and loosely over head 11. Loosely mounted over the forward portion of head 11 and adjacent ring 17 is free race ring 9. Balls 18 are set between rib 12 and free race ring 9, said balls riding in a ball race groove 20 in said stem and in a ball race groove 21 in free race ring 9. Axially extending wall 14 is turned inward to have an annular lip 22 for keeping free race ring 9 from moving away axially from rib 12. Feed passages 23, of small cross section, extend from reservoir 16 through rib 12 just to one side of ball race groove 20. Some of the passages are located on the radially inward side of said groove and others on the radially outward side of said groove, Fig. 2. A vent 24 through radially extending wall 15 connects reservoir 16 with atmosphere. Additional vents may be used as desired.

Space 25 between the race rings, as well as reservoir 16, is packed with a grease which is fairly stiff at ordinary temperatures.

It is believed the action is as follows: As the bearing warms up, the grease expands and the surplus thus created in reservoir 16 squeezes through passages 23 into space 25. Upon cooling, the grease contracts and air is sucked in from the outside through air vent 24. The next time the bearing goes into action and its temperature is raised, the grease expands again forcing a certain amount again into space 25, the expansion of the air previously sucked in helping to force out the grease. Also the melting of the grease would cause some of it to run out of the passages. This action continues with alternate heating and cooling of the bearing, the bulk of the grease being protected from the atmosphere. Provision can be made for a grease fitting to replenish the lubricant in the reservoir as it gives out. Experience, however, has shown that this is unnecessary, with the proper proportioning of reservoir 16 and passages 23.

In Fig. 4 is shown a modified form of my bearing in which free race ring 26 has a tight fit inside shell 27, the rear of the shell extending over axial leg 28 at the radially outward end of stem 29 of fixed race ring 30. Said latter ring has a head 31. Rib 29 extends radially outward from head 31 at an intermediate portion axially of the latter. Space for a reservoir 32 is provided in the annular space located between the radially inner face of leg 28, the radially outer face of the rear of head 31 and the rear face of rib 29. The rear ends of head 31 and leg 28 are peened over to hold an annular sheet metal plate 33 in place to serve as the rear wall of reservoir 32. Feed passages through rib 29, such as shown at 34, are provided between reservoir 32 and a place adjacent ball race groove 37. Balls 18 are held in a Z-shaped retainer ring 17 between rib 29 and free race ring 26, rolling in ball race grooves 37 and 38. A vent is provided at 39 in plate 33. In addition to providing vent 39, one can be provided at 40 in rib 29. Reservoir 32 is packed with high melting point grease as well as space 41 between the race rings. Air is drawn into vent 40 through the clearance between race ring 26 and head 31 and across space 41 at its radially inward portion because when the bearing rotates the grease is forced into the radially outward portion of space 41, leaving the radially inward portion substantially free to the passage of air. The action of the bearing is similar to that described for the bearing of Fig. 3, grease being sent out from reservoir 32, through feed passages 34 as the bearing heats up in use.

The bearing of Fig. 5 which is capable of taking a radial as well as a horizontal thrust, comprises a T-shaped fixed race ring 42 which has a tight fit inside of spun sheet metal shell 43. The axially extending wall 44 is in tight engagement with the radially outward end of rib 45, while the radially inward edge of radially extending wall 46 is in tight engagement with head 47. A reservoir 48 is formed by shell 43 to the rear of rib 45 and radially outward from head 47. Feed passages, such as that shown at 49, extend from reservoir 48, through rib 45 to a place adjacent ball race groove 50. It is to be noticed, that unlike the previously described bearings, there is a large fillet between the forward face of rib 45 and the forward portion of head 47. A ball race groove 50 is provided in the fillet. Its complementary groove 51 is provided in free race ring 54. These grooves are so located that a line joining their centers is at an inclination with the longitudinal axis of the bearing. Balls 18 are set in said race grooves between stem 45 and free race ring 54. Enough balls 18 are used to fill the race grooves so that no retainer ring is necessary. A vent 55 is provided in the radially extending wall 46. Free race ring 54, at its radially outward end, has a rearwardly inclined extension 56 to provide for the outer portion of race groove 51.

The action of the bearing of Fig. 5 is similar to that described for the previously discussed types.

Balls are shown between the race rings, but it will be readily understood that rollers can be substituted for the balls.

I claim:

1. A bearing comprising a pair of race rings, the first race ring having an inner axially extending portion and a rib extending radially outward from said portion at an intermediate place thereof, the second race ring comprising a radially extending portion loosely mounted on said axially extending portion to one side of said rib, encasement means in a tight fit with said axially extending portion on the other side of said rib, said encasement means also having a tight fit with the rib for enclosing a space to said other side of the rib and radially outward from said axial portion for providing a lubricant reservoir, and members adapted to roll between the rib and the second race ring in contact with each and holding them in spaced relation, said rib being provided with at least one feed passage through it leading from the reservoir to the space between the rib and the second race ring.

2. A bearing comprising a pair of race rings, the first race ring having an inner axially extending portion and a rib extending radially outward from said inner portion at an intermediate place thereof, the second race ring comprising a radially extending portion loosely mounted on said inner portion to one side of said rib, a flange on the outer part of the rib extending axially away from the second race ring, the rib, inner portion and flange partially enclosing a space, and a washer held between said flange and inner portion completing the enclosing of said space for providing a lubricant reservoir, members adapted to roll between the rib and the second race ring in contact with each and holding them in spaced relation, said rib being provided with at least one feed passage through it leading from the reservoir to the space between the rib and the second race ring.

3. A bearing comprising a pair of race rings, the first race ring having an inner axially extending annular portion and a rib extending outward from said portion at an intermediate place thereof, the second race ring comprising a radially extending portion loosely mounted on said axially extending portion to one side of said rib, means for enclosing a space to the other side of said rib and radially outward from said axially extending portion for providing a lubricant reservoir, members adapted to roll between the rib and the second race ring in contact with each and holding them in spaced relation, said rib being provided with at least one feed passage through it leading from the reservoir to the space between the rib and the second race ring, and a thin walled annular shell over the outside of the rib and the second race ring and fixed to one of them closing off the space between the rib and second race ring and keeping the race rings from separating axially.

4. A bearing comprising a pair of race rings, the first race ring having an inner axially extending annular portion and a rib extending outward from said portion at an intermediate place thereof, the second race ring comprising a radially extending portion loosely mounted on said axially extending portion to one side of said rib, members adapted to roll between the rib and the second race ring in contact with each and holding them in spaced relation, and a thin walled annular shell enclosing a space to the other side of said rib and radially outward from said axially extending portion, said shell having a radially extending wall with its inner end in tight contact with said axially extending portion and an axially extending wall in a tight fit with the outside of said rib, said latter wall extending over the second race ring being in loose engagement therewith, said rib being provided with at least one feed passage through it leading from the reservoir to the space between the rib and the second race ring.

5. A bearing comprising a pair of race rings, the first race ring having an inner axially extending portion and a rib extending radially outward from said portion at an intermediate place thereof, the second race ring comprising a radially extending portion loosely mounted on said axially extending portion to one side of said rib, means for enclosing a space to the other side of said rib and radially outward from said axial portion for providing a lubricant reservoir, and members adapted to roll between the rib and the second race ring in contact with each and holding them in spaced relation, said rib being provided with at least one feed passage through it leading from the reservoir to the space between the rib and the second race ring, each race ring being provided with a ball race groove so located that a line joining the centers of the grooves is at an inclination with the longitudinal axis of the bearing, the race groove on the first ring being substantially at the junction of the rib and the axially extending portion of said first ring, the end of said feed passage at the space betwen the rings being to one side of the latter race groove.

6. A bearing comprising a pair of race rings, and members adapted to roll between said race rings in contact with each race ring, a lubricant reservoir being formed in one race ring at a place away from said members, said latter ring being formed with an axially extending portion and a portion extending radially outward from said axially extending portion, at least one feed passage extending from the reservoir through said radially extending portion to the space between the race rings, each race ring being provided with a ball race groove so located that a line joining the center of the grooves is at an inclination with the longitudinal axis of the bearing, the race groove on the ring with the axially and radially extending portions being substantially at the junction of said portions, the end of said feed passage at the space between the rings being to one side of the latter race groove.

MORRIS KATCHER.